US 6,751,162 B2

(12) United States Patent
Dominguez et al.

(10) Patent No.: US 6,751,162 B2
(45) Date of Patent: Jun. 15, 2004

(54) SEISMIC SENSOR

(75) Inventors: Didier Dominguez, Oslo (NO); Irene Gabler, Paris (FR); Jacques Orban, Garches (FR)

(73) Assignee: WesternGeco, LLC, Houston, TX (US)

( * ) Notice: Subject to any disclaimer, the term of this patent is extended or adjusted under 35 U.S.C. 154(b) by 0 days.

(21) Appl. No.: 10/220,011

(22) PCT Filed: Feb. 21, 2001

(86) PCT No.: PCT/IB01/00238
§ 371 (c)(1),
(2), (4) Date: Nov. 19, 2002

(87) PCT Pub. No.: WO01/16528
PCT Pub. Date: Sep. 7, 2001

(65) Prior Publication Data
US 2003/0099155 A1 May 29, 2003

(30) Foreign Application Priority Data
Mar. 1, 2000 (GB) .............................................. 0004768

(51) Int. Cl.⁷ .................................................. G01V 1/36
(52) U.S. Cl. ........................ 367/166; 367/153; 367/162; 367/171; 367/179; 181/400; 181/402
(58) Field of Search ............................... 367/153, 154, 367/162, 166, 171, 179, 173; 181/400, 401

(56) References Cited

U.S. PATENT DOCUMENTS

| 4,292,590 | A | * | 9/1981 | Wilson .......................... 324/226 |
| 4,701,890 | A | * | 10/1987 | Ohmer et al. .................. 367/2 J |
| 4,893,290 | A | * | 1/1990 | McNeel et al. ............. 367/178 |
| 5,080,190 | A | * | 1/1992 | Owen et al. .................. 181/122 |
| 5,128,898 | A | * | 7/1992 | Hill et al. ..................... 367/13 |
| 6,061,302 | A | * | 5/2000 | Brink et al .................. 367/185 |

* cited by examiner

Primary Examiner—Nelson Moskowitz
(74) Attorney, Agent, or Firm—David S. Figatner; Williams, Morgan & Amerson, P.C.

(57) ABSTRACT

A seismic sensor contains a geophone (4) disposed within a housing (12). The sensor is also provided with locking means (14, 19, 21) that can either lock the geophone 4 relative to the housing, or can allow the geophone to rotate within the housing.

The geophone (4) is enclosed in a casing (1) which is so constructed that the overall mass distribution of the casing and geophone is uneven. The casing and geophone assembly thus adopts a preferred orientation when the sensor is unlocked.

A liquid can be disposed within the housing, so that the casing (1) and geophone (4) can float when the sensor is unlocked.

8 Claims, 10 Drawing Sheets

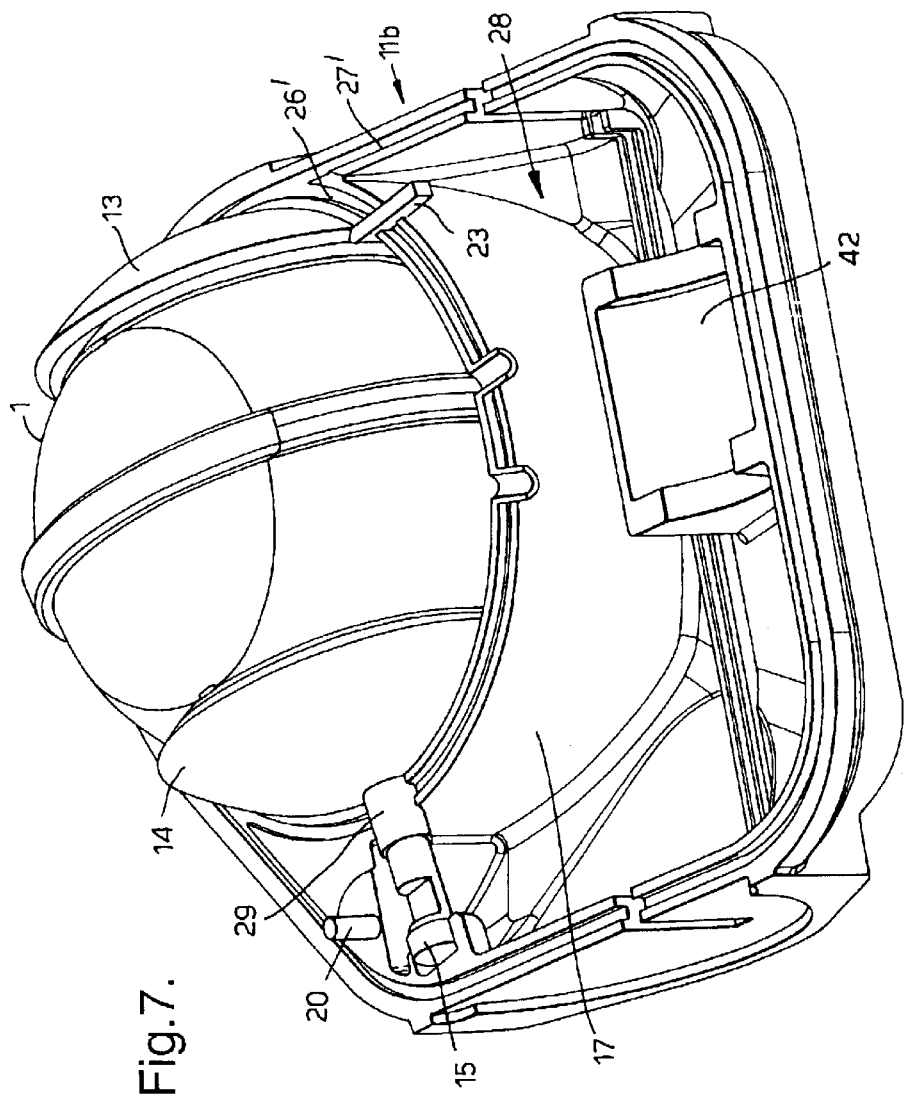

SEISMIC SENSOR

The present invention relates to a seismic sensor, in particular to a seismic sensor that incorporates a geophone.

A geophone is a well-known seismic sensor (or seismic receiver) that is in widespread use in the field of seismic surveying. Typically, an array of geophones will be distributed around a source of seismic energy. Energy emitted from the seismic source is reflected by geological structures within the earth, and the reflected energy is received at the geophones. From an analysis of the energy reflected to each particular geophone it is possible to derive information about the geological structure of the earth.

A geophone incorporates a moving coil. Seismic energy incident on the geophone induces vibrations of the coil, and an electrical output signal is derived from the vibrations of the coil. In order to ensure accurate operation of the geophone the moving coil must be mounted with its axis vertical, or at least within ±10° of the vertical.

One type of prior art seismic sensor comprises a geophone that is packaged in a housing. A spike is provided on the exterior of the housing, and this spike extends in a direction substantially parallel to the axis of the moving coil. Such a seismic sensor is used by pushing the spike into the ground, to secure the sensor in position. This ensures good coupling between the geophone and the ground, and if the spike is driven hard into firm ground the axis of the geophone is unlikely to move.

One disadvantage of this known seismic sensor is that, as noted above, it must be disposed such that the axis of the moving coil of the geophone is within ±10° of the vertical. This means that after each geophone has been planted in the ground, it must be checked to ensure that the axis of the moving coil is within 10° from the vertical, and this is time-consuming where a large array of sensors is being used. If the orientation of the geophones is not checked, and it should happen that some of them are mounted with the axis of the moving coil at more than 10° from the vertical axis, then the quality of the obtained seismic data will be degraded. A further disadvantage of this prior art seismic sensor is that it is very difficult to deploy automatically, since the processes of planting the sensor in the earth and checking its orientation is difficult to automate.

An alternative prior art seismic sensor that comprises a geophone has the geophone moveably mounted in a housing. The geophone is mounted on gimbals that incorporate low-friction ball bearings. Because the geophone is mounted on gimbals, it can orientate itself such that the axis of the moving coil is vertical regardless of the orientation of the housing.

Although this prior art seismic sensor solves the problem of mounting the sensor such that the axis of the coil is substantially vertical, it is not without its own disadvantages. In particular, external noise sources can generate unwanted oscillations of the geophone, and this will produce noise in the output signal from the geophone and so degrade the quality of the seismic data obtained. It is possible to introduce a viscous liquid into the housing to dampen oscillations of the geophone induced by external noise, but this does not provide a complete solution since it will not prevent oscillation of the geophone. A further disadvantage of this type of seismic sensor is that they are expensive, owing to the need to provide the complex gimbal mechanism.

The present invention provides a seismic sensor comprising: a housing; a geophone rotatably mounted within the housing; and a locking means for releasably preventing movement of the geophone relative to the housing.

A seismic sensor according to the present invention has two states: locked and unlocked. In the unlocked state, the geophone can move, for example rotate, within the housing, in order to orientate itself with the axis of its coil substantially vertical. Once the geophone is correctly orientated, the sensor can be locked. In its locked state, movement of the geophone relative to the housing is prevented. Since the geophone is locked relative to the housing, a source of external noise will not cause unwanted oscillations of the geophone, so that the sensor can be used to obtain high quality seismic data.

In a preferred embodiment of the invention, the locking means comprising a locking material disposed within the housing, the locking material being solid at the normal operating temperature of the sensor. In order to unlock the sensor, it is necessary only to heat the locking material to its melting point; once the locking material melts, the geophone will be able to rotate within the housing. Once the geophone is correctly oriented, the sensor is locked simply by allowing the locking material to cool below its melting point.

In an alternative preferred embodiment, the locking means is moveable between a first position in which it exerts a locking force on the geophone so as to prevent movement of the geophone relative to the housing and a second position. The sensor is locked or unlocked by moving the locking means into the first position or the second position respectively.

Other preferred features of the present invention are set out in the dependent claims, to which attention is directed.

Preferred embodiments of the present invention will now be described by way of illustrative example with reference to the accompanying figures in which:

FIG. 1(*b*) is a cross-sectional view through the casing of FIG. 1(*a*);

FIG. 6(*b*) is a sectional view of the housing of FIG. 5;

FIG. 7 is a perspective view of a seismic sensor according to a second embodiment of the present invention in the course of assembly;

Figure 1A:
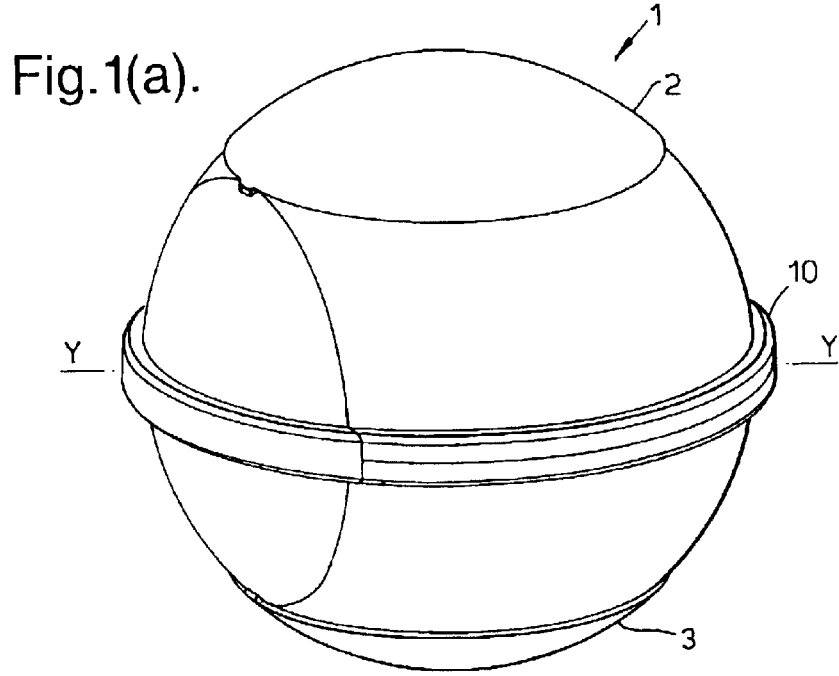
FIG. 1(*a*) shows a casing for a geophone for use in a seismic sensor according to the invention.

FIG. 1(*a*) shows a casing 1 for a geophone used in a seismic sensor of the present invention. As will be seen in FIGS. 1(*b*) and 2, a geophone 4 is disposed within the casing 1, and is oriented such that the axis of the moving coil of the geophone is substantially parallel to the axis Y—Y shown in FIGS. 1(*a*) and 2. As explained above, in use the casing 1 is preferably oriented within the sensor such that the axis Y—Y is substantially vertical so that good quality seismic data is obtained. The construction of the casing 1 will be described with reference to FIGS. 1(*a*) to 4.

The casing comprises first and second electrode portions 2, 3. Each of these is electrically connected to one of the output contacts 2', 3' of the geophone 4.

The casing 1 further comprises first and second casing portions 5, 6. It is undesirable for the geophone 4 to vibrate within the casing, since this would degrade the seismic data and could also result in physical damage to the geophone. The interior of the casing portions 5, 6 therefore preferably define a recess that is so dimensioned and so shaped that the geophone 4 fits snugly into the recess and is prevented from vibrating within the casing.

Figure 3:
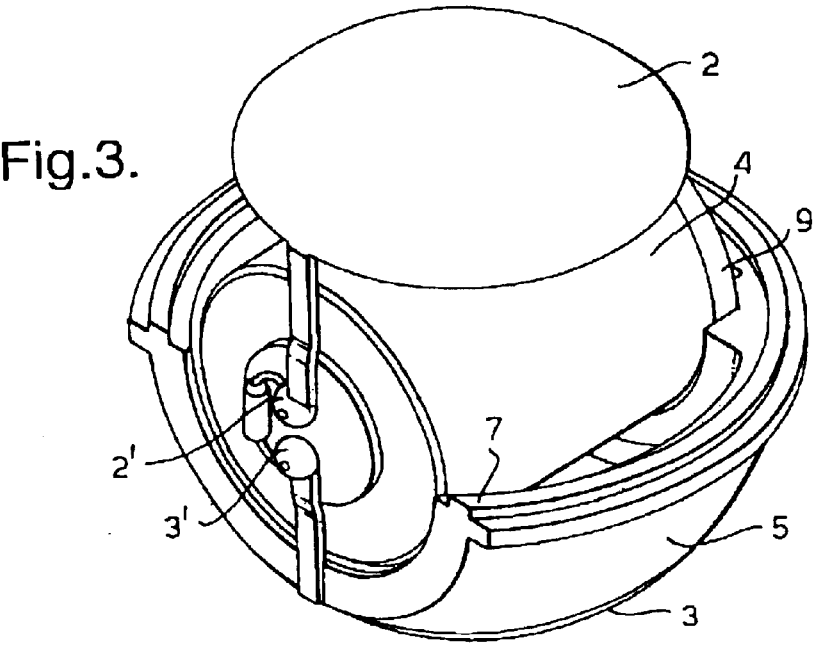
Figure 4:
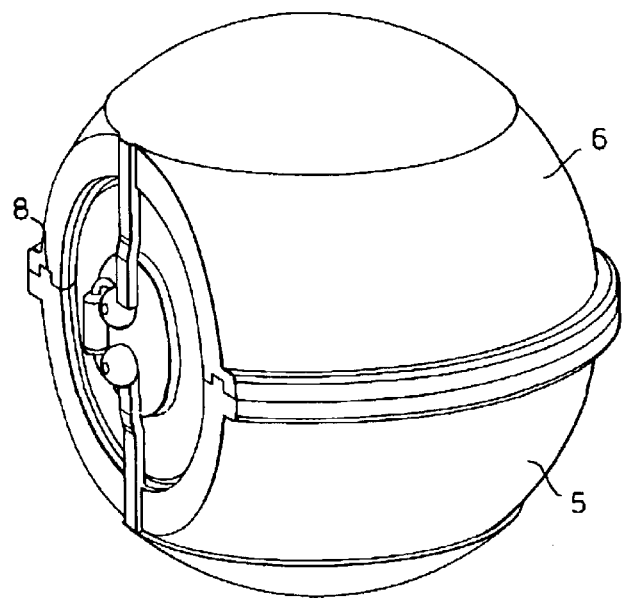

In the embodiment shown in FIGS. 3 and 4 one of the casing portions 5 is provided with a protruding portion 7 that fits into a recess 8 provided in the other casing portion, to locate the two casing portions 5, 6 together. The invention is not, however, limited to this method of locating the casing portions together. The casing portions 5, 6 are preferably secured to one another by a suitable adhesive, since this provides a low-cost assembly. Other conventional methods of securing the casing portions 5, 6 to one another can alternatively be used, such as screws, or nuts and bolts.

Figure 1B:
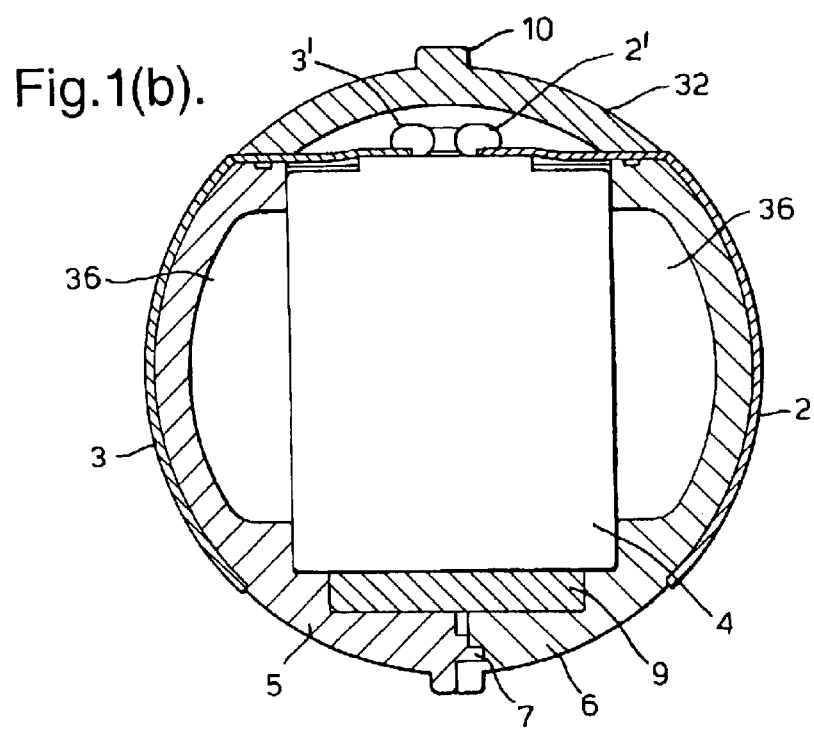
Figure 2:
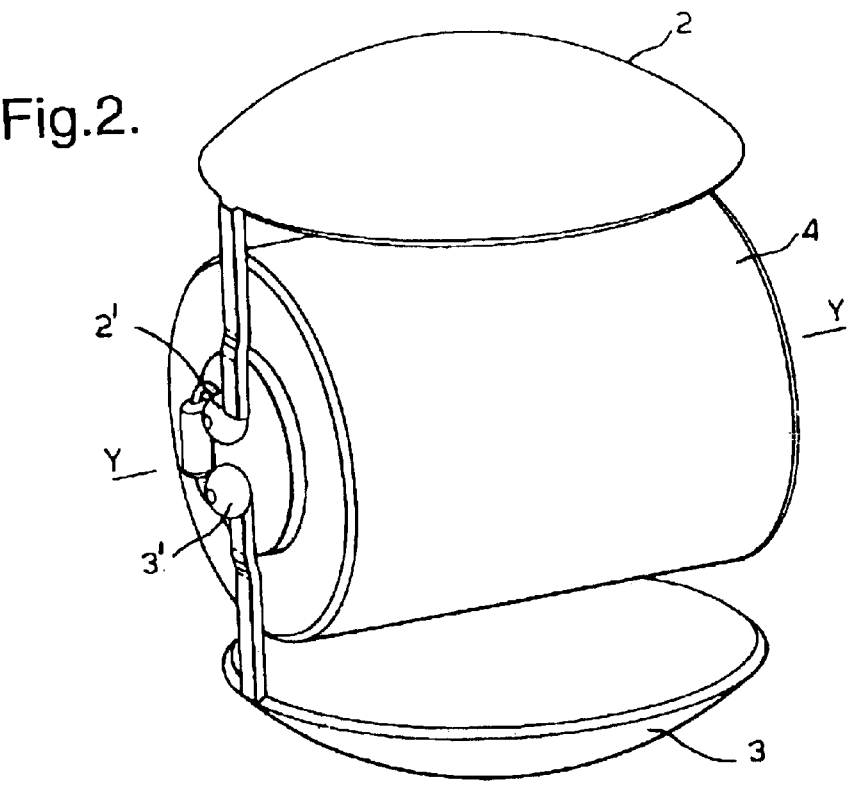
FIGS. 2, 3 and 4 show stages in the assembly of the casing shown in FIG. 1(*a*)

The casing 1 further comprises a weight 9. This is provided at the bottom of the casing 1 (here "top" and "bottom" refer to the preferred orientation of the casing when the sensor is in operation). The weight 9 is sufficiently heavy so that the centre of gravity of the geophone and casing assembly is below the geometric centre of the casing when the casing is oriented with the axis Y—Y vertical. In FIG. 1(b) the weight 9 has the form of a flat disc, but the shape of the weight is not limited to this particular shape.

The casing is completed by an end casing portion 32. This is secured to the casing portions 5,6 in any suitable way, for example in one of ways described above for securing the casing portions 5,6 to one another.

FIG. 1(b) is a cross-section of the assembled casing 1. It will be seen that parts of the interior of the casing are empty (that is air-filled), and these reduce the overall density of the casing and geophone.

The outer surfaces of the electrode portions 2, 3, and the casing portions 5, 6, 32 are parts of the surface of a sphere. The casing 1 is thus substantially spherical.

A protruding circumferential ridge 10 is provided on the outer surface of the casing 1, for reasons that will be discussed below.

The components of the casing can be made of any suitable material. In principle the electrodes 2, 3 may be formed of a plastics material that is provided with a conductive coating. However, this can lead to problems with the conductive coating peeling off and the electrodes 2,3 are preferably metallic.

The materials of the casing portions 5, 6, 32 must be chosen so that the electrodes 2, 3 are electrically insulated from one another. The casing portions 5, 6, 32 can be made from any electrically insulating material with suitable structural properties such as, for example, a plastics material. The weight 9 can be made from a dense material such as, for example, steel or lead.

Figure 6A:
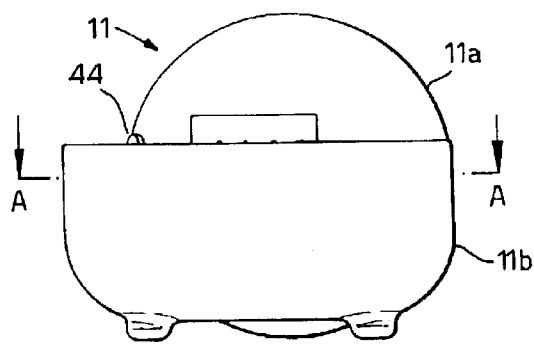
FIG. 6(*a*) is a plan view of the housing of FIG. 5.
Figure 6B:
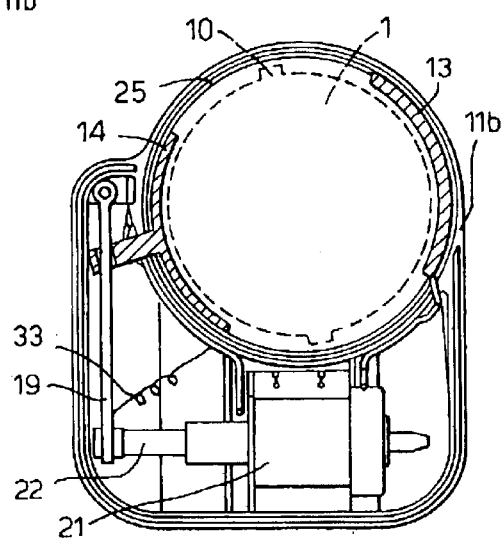
Figure 5:
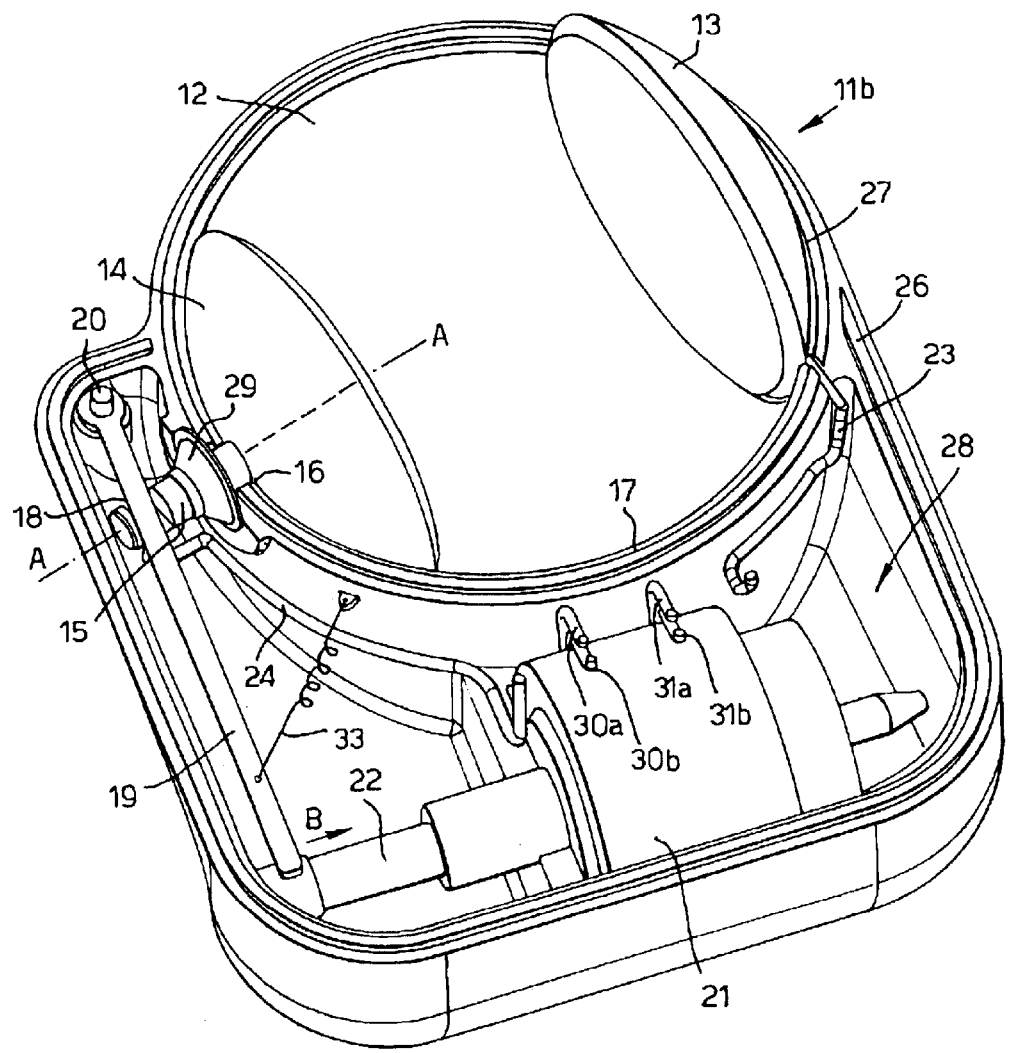
FIG. 5 is a perspective partial view of a housing of a seismic sensor according to a first embodiment of the invention.

FIGS. 5 to 6(b) show a seismic sensor according to a first embodiment of the present invention. This seismic sensor comprises a geophone enclosed with a casing of the type shown in FIG. 1, and this casing is disposed within a housing 11. The housing 11 is constructed from two housing portions 11a, 11b. One of the housing portions 11b is shown in FIGS. 5 and 6(b).

The housing 11 comprises a recess 12 for receiving a geophone 4 that has been enclosed in a casing 1 of the type shown in FIG. 1. The shape of the recess is complementary to the shape of the casing 1 enclosing the geophone, although the size of the recess 12 is greater than the size of the casing 1.

The first housing portion 11b is shown in FIG. 5 in perspective view, and in FIG. 6b in plan view. The recess 12 is defined partially in the first housing portion 11b, and partially in the second housing portion 11a, which is generally similar in shape to the first housing portion 11b.

First and second housing electrodes 13, 14 are provided in the recess 12. In the embodiment of FIGS. 5 to 6(b), these are provided on the first housing portion 11b. In use, the casing 1 enclosing the geophone is disposed within the recess 12 such that one of the casing electrodes 2 makes contact with one of the housing electrodes 13 and the other of the casing electrodes 3 makes electrical contact with the other housing electrode 14. The inner surfaces of the housing electrodes 13,14 are shaped to be complementary to the outer surfaces of the casing electrodes 2,3 of the casing 1, so as to provide good electrical contact. In this embodiment the casing electrodes 2,3 have a substantially spherical outer surface, and the inner surface of each of the housing electrodes 13,14 is therefore also spherical.

One of the housing electrodes 13 is fixedly mounted within the recess 12. However, the other housing electrode 14 is mounted in the recess 12 such that it can be moved towards the centre of the recess or retracted from the centre of the recess, along the axis A—A indicated in FIG. 5. In this embodiment the movable mounting of the housing electrode 14 is achieved by providing the moveable housing electrode with a shaft 15 that projects from the outer surface of the electrode and passes through an aperture 16 in the wall 17 defining the recess 12 within the housing portion 11b. A notch 18 is provided in the shaft 15 of the moveable recess electrode. A locking member 19, which is pivotally mounted at one end on a pivot 20, passes through the notch in the shaft 15 of the moveable housing electrode 14. By moving the end of the locking lever 19 remote from the pivot 20 in the direction indicated by the arrow B, it is possible to move the shaft 15 along the axis A—A, towards the centre of the recess 12, thereby moving the movable housing electrode 14 towards the fixed housing electrode 13. Moving the end of the locking lever 19 remote from the pivot in the opposite direction to that indicated by the arrow B will cause the movable housing electrode 14 to move away from the fixed housing electrode 13.

The size of the recess 12 within the housing is made sufficiently large so that, when the casing 1 is disposed within the recess 12, it is possible to lock or unlock the casing 1 relative to the housing by moving the moveable housing electrode 14 towards or away from the fixed housing electrode 13. That is, when the moveable housing electrode 14 is moved as far away from the fixed housing electrode 13 as possible, the distance between the inner faces of the moveable and fixed housing electrodes should be greater than the diameter of the casing 1, so that the casing 1 can rotate within the recess 12. Conversely, by moving the moveable electrode 14 towards the fixed electrode 13, the separation between the fixed and moving housing electrodes 13, 14 can be made equal to the diameter of the casing 1 so that the casing is gripped between the fixed and moveable housing electrodes. The frictional force generated between the housing electrodes 13, 14 and the casing 1 will prevent rotation of the casing within the recess 12. Thus, in this embodiment electrical connection to the geophone is provided by the locking means when the sensor is in the locked state.

Means for actuating the locking lever 19 are provided. In the embodiment shown in FIG. 5, the actuating means comprise a stepping motor 21. The stepping motor is provided with two pairs of electrical leads 30a,30b; 31a,31b that are connected to contacts (not shown) provided on the outside of the housing portion 11b so that an electrical current can be supplied to the stepping motor 21.

The locking lever 19 is biased in the direction indicated by the arrow B in FIG. 5. The bias force tends to urge the moveable housing electrode 14 towards the fixed housing electrode 13, so that the sensor is biased towards its locked state. In FIG. 5 the bias force is applied by a coil spring 33, one end of which is attached to the wall 17 defining the recess 12 and the other end of which is attached to the locking lever 19. The spring 33 is in tension, and so exerts a force on the locking lever that tends to bias the sensor into its locked state. The bias means is not, however, limited to the coil spring shown in FIG. 5, and any suitable means for biasing the sensor towards its locked state can be used.

The stepping motor 21 has two coils, one connected to one pair of leads 30a,30b and the other connected to the other pair of leads 31a,31b. To drive the stepping motor such that its armature moves in a direction opposite to the arrow B, a pulse signal or square wave signal is applied to each coil, with the signal applied to the second coil having a phase shift of 90° compared to the signal applied to the first coil. With each pair of pulses that is applied the armature of the motor will move by one step in the direction opposite to the arrow B. To reverse the direction of motion of the armature, the phase shift between the two pulses is changed to −90°, so that with each pair of pulses that is applied the armature of the motor will move by one step in the direction of the arrow B.

In order to unlock the sensor, the stepping motor 21 is actuated to apply a force in the opposite direction to the arrow B to the end of the locking lever 19 that is remote from the pivot 20. This is done by applying pairs of pulses to the stepping motor 21 as described above. The result of applying such a force to the remote end of the locking lever is that the locking lever 19 is caused to rotate about the pivot 20 so as to move the moveable housing electrode 14 away from the fixed housing electrode 13 thereby putting the sensor into the unlocked state. In order to lock the sensor, the armature of the motor is moved in the direction of the arrow B, by changing the phase shift between the current pulses applied to the two coils of the stepping motor, and the bias force applied to the locking lever ensures that the sensor is returned to its locked state.

One advantage of using a stepping motor as the actuating means is that the armature of the motor will always move by the same distance for each pair of pulses that is applied. Thus, the position of the armature can be calculated from knowledge of the number of pairs of pulses applied to the stepping motor, and it is not necessary to provide a detection means to determine the position of the locking lever. A further advantage of using a stepping motor is that a stepping motor can be driven by a digital input signal.

The armature of the stepping motor 21 should remain fixed unless a pulse is applied to the motor. This means that, in principle, the bias means could be omitted and the stepping motor could be used to lock and unlock the sensor.

Although a stepping motor is used to actuate the locking lever 19 in the embodiment of FIGS. 5, 6(a) and 6(b), the invention is not limited to this. Any suitable actuating means can be used to actuate the locking lever 19, such as, for example, a solenoid or a d.c. current motor. If actuating means other than a stepping motor are used, it might be necessary to provide detection means, such as a feed-back loop, to detect the amount of movement of the locking lever.

In the embodiment of FIGS. 5, 6(a) and 6(b) the actuating means (the stepping motor 21) is disposed within a chamber 28 defined within the housing 11. This is preferable since it provides protection for the actuating means, but in principle, the locking lever could protrude through an aperture in the housing with the actuating means being disposed outside the housing.

In the embodiment of FIGS. 5, 6(a) and 6(b) the chamber 28 for the actuating means is provided predominantly within the first housing portion 11b, but it would be possible for the chamber for the actuating means to be provided substantially equally within the two housing portions.

The first housing portion 11b is provided with raised protrusions 26, 27. When the two housing portions are assembled, these protrusions fit into complementary recesses provided on the second housing portion 11, to ensure correct alignment of the two housing portions. The two housing portions are preferably secured together in a way that allows the sensor to be dis-assembled to allow the components of the sensor to be serviced or replaced, and this can be done for example using one or more bolts 44. In principle, however, the housing portions could be joined together using an adhesive.

To assemble a sensor of this invention, the two housing portions 11a, 11b are assembled with the casing 1, which contains the geophone 9, located within the recess 12 defined within the housing 11. The casing is shown in broken lines in FIG. 6(b), which is cross-section through FIG. 6(a) long the line A—A.

In operation, the sensor is placed in its preferred location, and the housing is secured in a particular orientation. The orientation of the housing is not particularly critical, since it is possible to adjust the orientation of the geophone within the housing, by unlocking the sensor. If the sensor is intended for use on land a spike can be provided on the outside of the housing to allow the sensor to be secured in a fixed orientation at a desired position; if provided, such a spike would also provide good seismic coupling between the sensor and the ground. The sensor is preferably locked during the process of positioning the sensor, to prevent damage to the geophone.

Once the housing of the sensor has been secured in position the sensor is then unlocked, to allow the casing to adopt, under the action of gravity, an orientation in which the weight 9 is lowermost and the axis of the moving coil of the geophone 4 is vertical. Thus, a sensor of the present invention can easily be oriented so that the axis of the coil of the geophone is vertical, since the orientation of the geophone itself is independent from the orientation of the housing. Moreover, since the sensor is unlocked using the actuating means 21, the sensor can be unlocked by a remote operator or even automatically.

When the geophone has been oriented correctly, the sensor is locked. In its locked state, the casing 1 is gripped firmly between the moveable electrode 14 and the fixed electrode 13, so that movement of the casing relative to the housing is prevented. Locking the sensor in this way prevents external noise from causing unwanted vibrations of the coil of the geophone.

Locking the sensor also establishes electrical contact between the fixed and moveable electrodes 13, 14 and the geophone, via the electrode portions 2, 3 provided on the casing. As is shown in FIG. 5, the housing electrodes 13, 14 are provided with electrical leads 23, 24 that pass out of the recess 12 to contacts (not shown) provided outside the housing 11, thus allowing the electrical signals produced by the geophone to be connected to suitable monitoring equipment. Furthermore, when the sensor is locked, good seismic coupling is provided between the housing and the casing 1, and hence to the geophone.

To make the process of orienting the geophone within the housing more efficient and reliable to carry out, it is desirable to ensure that the friction between the casing 1 and the housing 12 when the when the sensor is unlocked is as low as possible. In principle, friction could be reduced by, for example, providing the exterior of the casing 1 and/or the interior of the housing 12 with a low friction coating or by polishing the exterior of the casing and the interior of the housing. In a preferred embodiment of the invention, however, friction between the casing and the housing is reduced by providing a liquid in the recess 12 so that the casing 1 can float when the sensor is unlocked. This can be done, for example, by introducing a liquid into the recess 12 through an aperture (not shown) provided in the housing 11 for this purpose, after the housing has been assembled. A second aperture (also not shown) is provided to allow air to be expelled from the recess during introduction of the liquid. The quantity of liquid introduced into the recess should not be sufficient to completely fill the recess, and the liquid preferably has a density that is greater than the overall density of the casing 1 containing the geophone 4 so that the casing 1 can float in the liquid. It is preferable that the liquid used in not electrically conductive and does not attack the components of the sensor. It is also preferable that the liquid will remain in the liquid state throughout the intended operating temperature range of the sensor.

For land applications, a suitable liquid is dibromomedhane ($CH_2Br_2$). This is liquid in the temperature range from $-52°$ C. to $+96°$ C., and has a density of 2500 kg/m$^3$. For marine applications, tetrabromoethane ($C_2H_2Br_4$) can also be used. This is a liquid in the temperature range of $1°$ C. to $135°$ C. and has a density of 2,967 kg/m$^3$.

In an embodiment in which a liquid is disposed in the recess 12, when the sensor is unlocked, by moving the moveable electrode 14 away from the fixed electrode 13 to release the casing 1, the casing 1 will float in the liquid provided within the recess 12. When the casing floats in the liquid there will be little or no contact between the casing and the housing, so that friction between the casing and the housing will be virtually eliminated. When the sensor is unlocked, the casing will quickly adopt an orientation in which the weight 9 is lowermost and the axis Y—Y of the coil of the geophone is vertical.

In an embodiment where the recess 12 in the housing contains liquid, a seal 29 is preferably provided where the shaft 15 of the movable housing electrode passes through the aperture 16 in the wall 17, to prevent the liquid from leaking out of the recess 12 while allowing low friction motion of the shaft 15 through the aperture 16.

It will be appreciated that excessive rotation of the casing 1 when the sensor is unlocked is undesirable. For example, it might be possible for one of the electrodes 13, 14 on the housing to short out the two electrodes 2, 3 on the casing. Alternatively, if the casing were to rotate by 180°, polarity inversion would occur. In order to prevent excessive rotation of the casing, the casing electrodes 13, 14 are so dimensioned that, in conjunction with the ridge 10 provided on the exterior of the casing, they prevent excessive rotation of the casing 1. Alternatively, stops could be provided on the inside of the housing for limiting the rotation of the casing.

A second embodiment of a sensor according to the present invention is illustrated in FIGS. 7 to 12. This embodiment is generally similar to the embodiment of FIGS. 5, 6(a) and 6(b), and only the differences between the embodiments are described below. Like components in the two embodiments are denoted by like reference numerals.

FIG. 7 is a partial perspective view of a sensor according to the second embodiment of the invention during the assembly of the sensor. The sensor comprises a first housing portion 11b that defines part of the recess 12 and also defines part of the chamber 28. The chamber 28 is separated from the recess 12 by a wall 17 and, as in the first embodiment, the locking lever and actuating means (not shown in FIG. 7) are disposed within the chamber 28. A casing 1, containing a geophone 4, is disposed in the recess 12 defined in the housing portion 11b of the sensor. The housing portion 11b is also provided with the pivot 20 for the locking lever, and a mount 42 for the actuating means.

The housing portion 11b shown in FIG. 7 is generally similar to the housing portion 11b of the first embodiment. However, in the second embodiment of the invention, the housing is formed from three housing portions, rather than two housing portions as in the embodiment of FIGS. 5–6(b).

Figure 8:
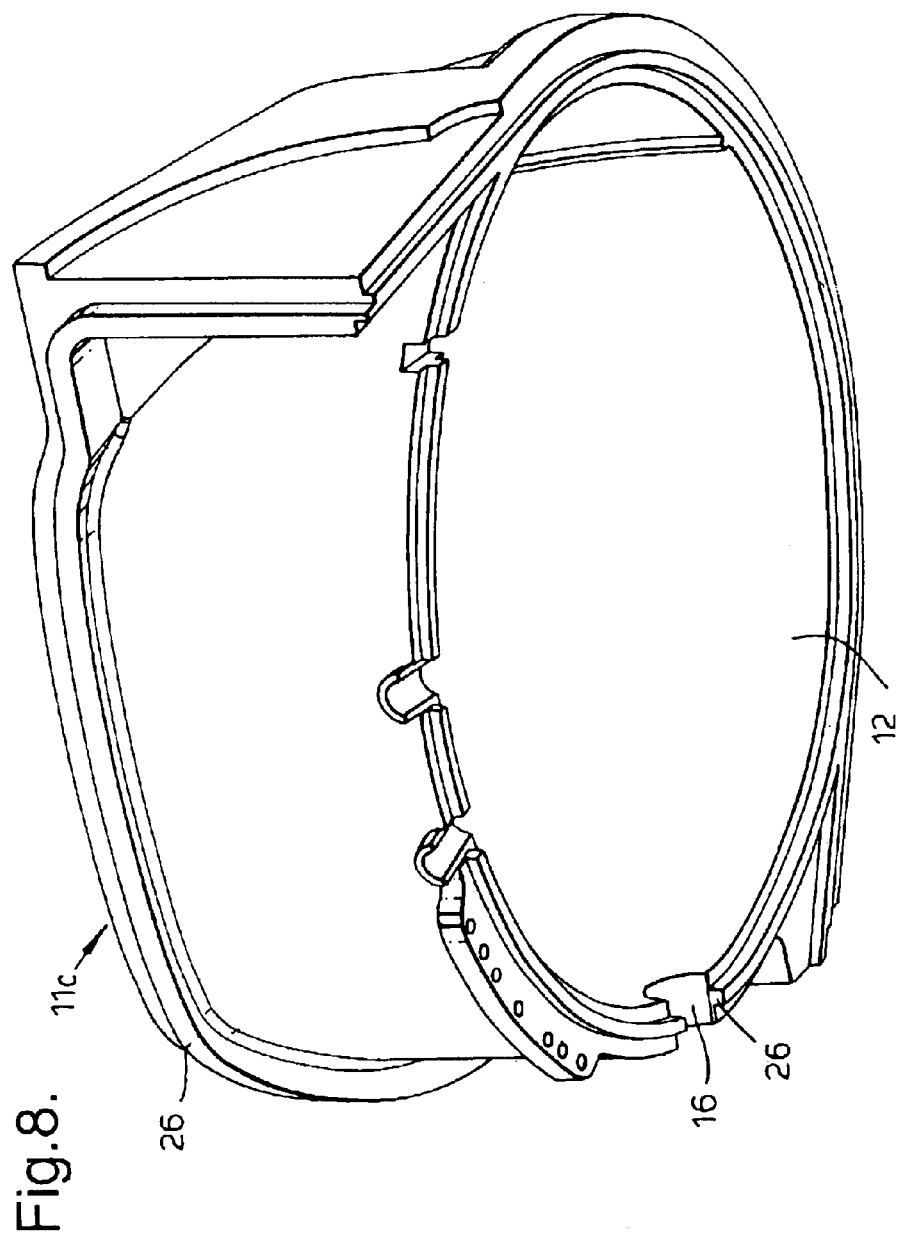
FIG. 8 is a perspective view of a part of the housing of a seismic sensor according to the second embodiment of the invention.
Figure 9:
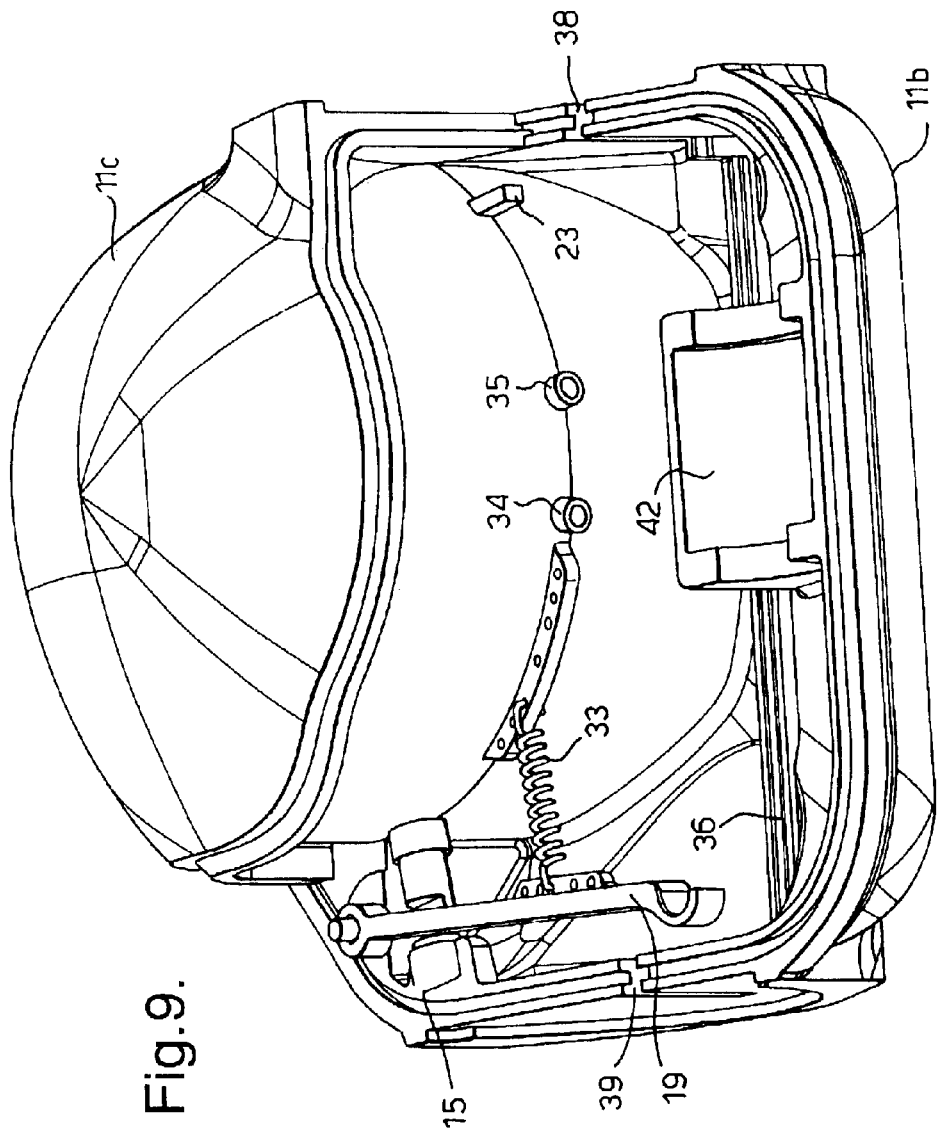
FIG. 9 is a perspective view of a seismic sensor according to the second embodiment of the present invention at a later stage of assembly.

A second of the housing portions that make up the housing 11 of a sensor according to the second embodiment of the invention is shown in FIG. 8. The second housing portion 11c also defines part of the recess 11. FIG. 9 shows the sensor during a later stage of assembly, after the recess 12 has been closed by assembling the housing portions 11b and 11c.

Two apertures 34, 35 are provided in the wall 17 that defines the recess 12 within the housing 11. In an embodiment in which a liquid is provided within the recess to allow the casing 1 to float when the sensor is unlocked, it is possible to introduce the liquid into the recess 12 through one of the apertures 34, 35, with the other aperture acting as a vent to allow air to be expelled from the recess during the introduction of the liquid. Once a sufficient quantity of liquid has been introduced into the recess, the apertures 34, 35 are sealed.

In this embodiment the apertures 34, 35 are defined partially in one housing portion 11b and partially within the second housing portion 11c. It is, however, possible for the apertures to be defined entirely within one of the housing portions 11b, 11c. In principle, it is also possible for the apertures to be provided in one of the external walls of the housing, rather than in the wall 17 that defines the recess 12 within the housing.

In this embodiment the locking lever 19 is again biased so that the locking lever tends to lock the casing 1 relative to the housing. FIG. 9 illustrates one possible form of bias means, and this is a coil spring 33, one end of which is attached to the locking lever 19 and the other end of which is attached to the wall 17 defining the recess. The spring 33 is in tension, and thus biases the sensor towards its locked position. Preferably, a number of possible attachment points for the spring are provided on both the locking lever 19 and the wall 17 defining the recess, so that the distance between the two attachment points of the spring 33 (that is, the point of attachment of the spring to the locking lever and the point of attachment to the wall 17) can be changed. This allows the bias force exerted by a particular spring to be adjusted, since the restoring force exerted by a given spring will depend upon the length to which it is stretched.

Figure 10:
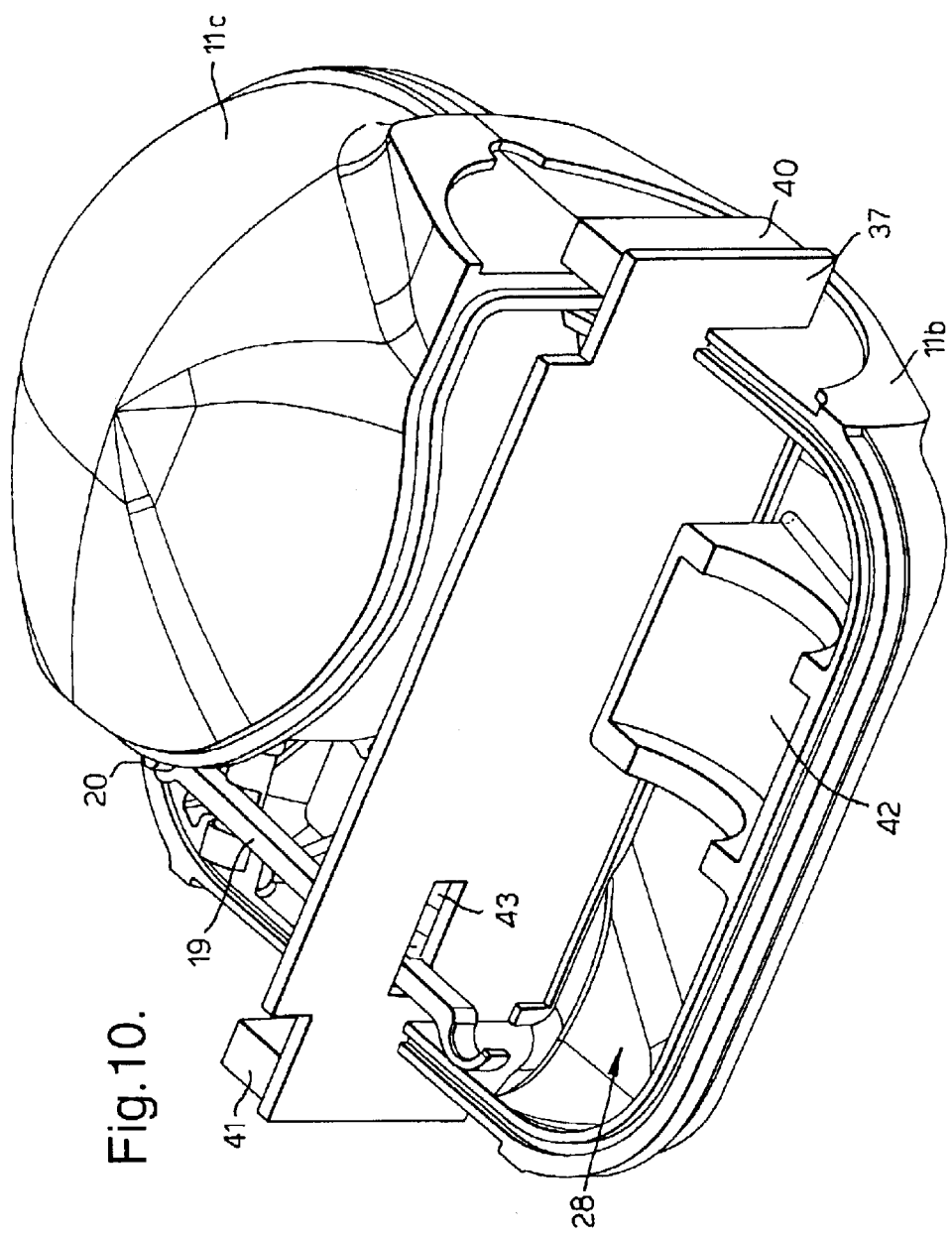
FIGS. 10 and 11 are perspective views of a seismic sensor according to the second embodiment of the present invention at a yet later stage of assembly.
Figure 11:
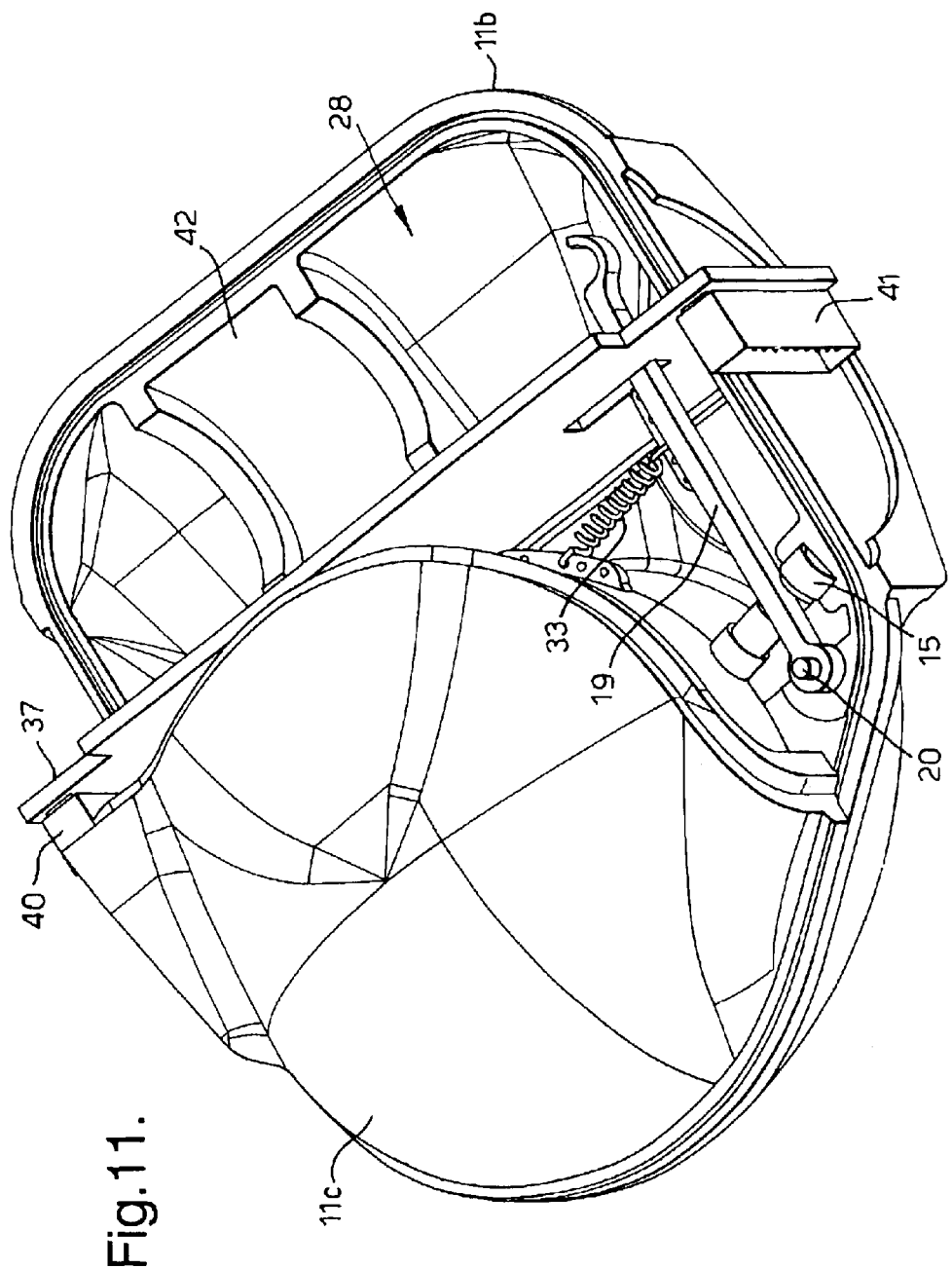

In this embodiment of the invention, the housing portion 11b is provided with a recess 36 for holding a circuit board, such as a printed circuit board. FIGS. 10 and 11 show, from different angles, the sensor after a printed circuit board 37 has been disposed in the recess 36. During assembly of the sensor, electrical leads within the sensor housing, such as the connections to the actuating means and the connections from the fixed and moveable housing electrodes 13, 14 are connected to the printed circuit board within the housing.

The housing portion 11b is also provided with apertures 38, 39 in its side walls, so that the printed circuit board 37 can extend to the outside of the housing. Electrical connectors 40, 41 are attached to the printed circuit board 37 at positions outside the housing, and this facilitates making electrical connections to the sensor.

In the embodiment shown in FIG. 10 the printed circuit board extends across the width of the housing, and an aperture 43 is provided within the printed circuit board to allow the locking lever to pass through the printed circuit board 37. In principle, the printed circuit board could pass through the housing 11 at only one point, so that it would not be necessary for the printed circuit board 37 to extend across the entire width of the housing 11 in this case, one of the apertures 38,39 in the housing portion 11b could be omitted.

Figure 12:
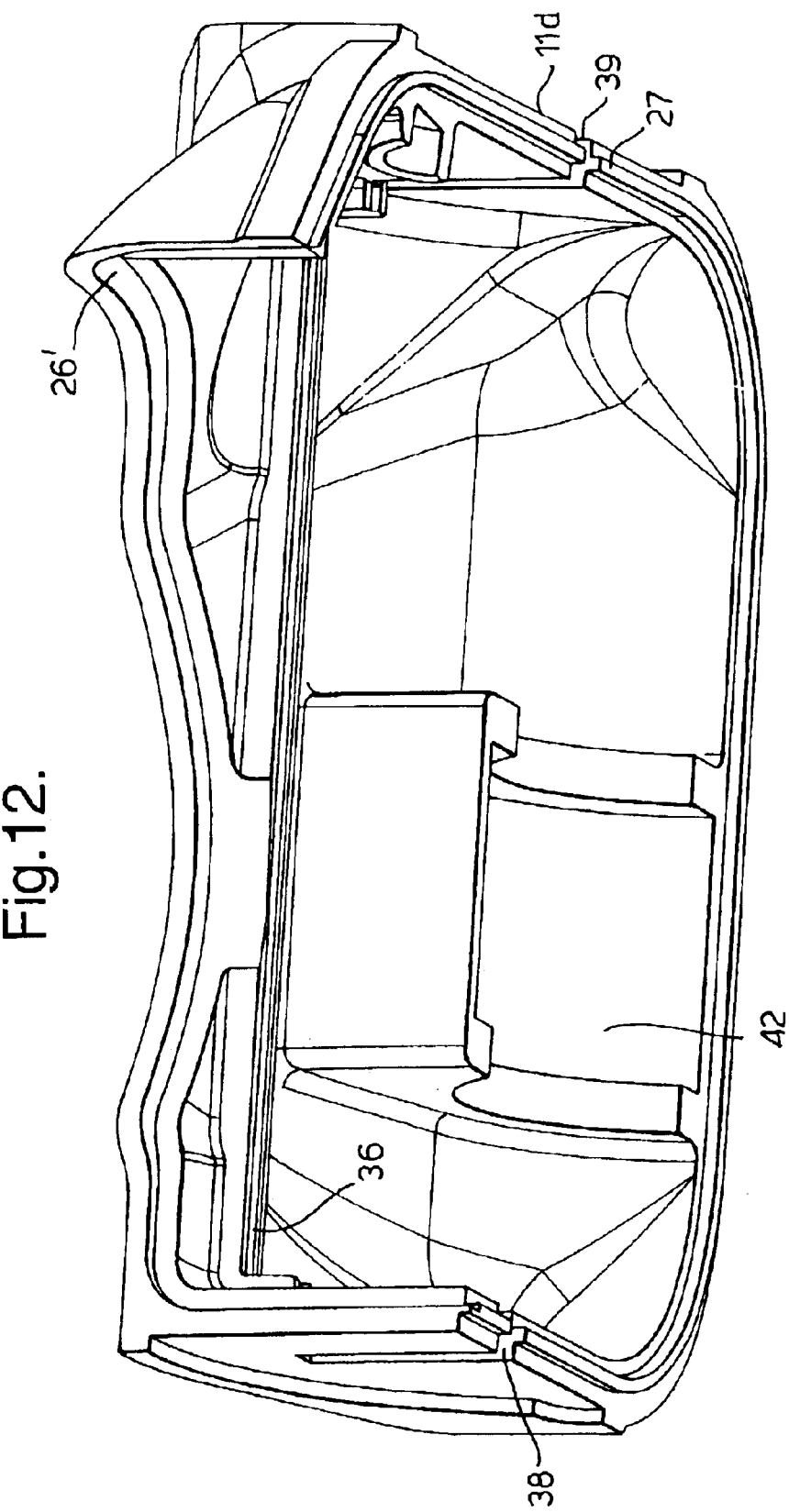
FIG. 12 is a perspective view of further part of the housing of a seismic sensor according to the second embodiment of the invention.

The third portion 11d of the housing of the sensor of the second embodiment of the invention is shown in FIG. 12. The third housing portion 11d closes the part of the housing that has not been closed by the housing portion 11c—that is, it closes the chamber 28. It can be seen that the second and third housing portions 11c and 11d of the second embodiment generally correspond to the housing portion 11a of the first embodiment. In the second embodiment the chamber 28 is substantially symmetrically disposed between the first and third housing portions 11b, 11d, but in principle it could be asymmetrically disposed between the two housing portions.

The third housing portion 11d also comprises a recess 36 for receiving the printed circuit board 37, a mount 42 for the actuating means, and apertures 38,39 to allow the printed circuit board to pass outside the housing of the sensor. As explained above with regard to the second housing portion 11c, one of the apertures 38,39 could be omitted if the printed circuit board 37 does not extend across the entire width of the housing.

Assembly of the sensor shown in FIGS. 10 and 11 is completed by disposing a suitable actuating means in the mount 42 in the housing portion 11b. The actuating means is then electrically connected to the printed circuit board 37, as are the connection 23 from the fixed housing electrode and the connection (not shown) from the moveable housing electrode. Finally, the third housing portion 11d is attached to the first and second housing portions 11b, 11c to close the chamber 28 and so complete the housing 11.

Protrusions 26,27 and complementary recesses 26',27' are provided on opposing edges of the housing portions 11b, 11c, 11d, to enable the housing portions to be located together correctly. The housing portion 11c is preferably secured to the housing portion 11b with a suitable adhesive. This enables a fluid-tight seal to be made at relatively low cost. The third housing portion 11d can also be secured to the housing portion 11b by an adhesive. However, if it is desired to be able to service or replace components within the housing, such as the spring 33, the actuating means, or the printed circuit board, it is possible to secure the third housing portion 11d to the housing portion 11b in a way that allows the two housing portions to be easily disassembled. For example, the third housing portion 11d can be secured to the housing portion 11b using screws or bolts.

The locking means of a seismic sensor of the present invention is not limited to the locking means shown in FIGS. 5 to 12. Any locking means that can releasably lock the geophone relative to the housing can be used.

In another embodiment of the present invention (not illustrated), the locking means is provided by a material within the recess 12 that is solid at the normal operating temperature of the sensor. In order to unlock the sensor, the locking material is heated to a temperature above its melting point. When the locking material melts, the casing 1 will be released, and will be able to rotate within the recess 12, so allowing the geophone to orient itself relative to the housing. Once the geophone is correctly oriented, the locking material is allowed to cool and solidify, so that movement of the geophone within the housing is prevented.

The locking material can be any material that has a melting point that is greater than the upper end of the desired temperature range of operation of the sensor. It is also, of course, preferred that the locking material does not attack the materials of which the housing or casing are made, and is not electrically conductive.

It is preferable that the melting point of the locking material is not significantly greater than the highest intended operating temperature of the sensor, since this will minimise the amount of heat required to melt the locking material in order to unlock the sensor. Where the sensor is intended for use on land, it is usually desirable that the melting point of the locking material is in the range of from 60° C. to 80° C. In the case of a sensor intended for use in a marine environment, the maximum required operating temperature will be lower, and the melting point of the locking material is preferably greater than 25° C., for example in the range 25° C. to 30° C.

For land applications, a wax or a similar material can be used as the locking material. A wax having a low melting point, of around 25° C. to 30° C., is suitable for a sensor intended for marine use.

In an embodiment in which the locking means is provided by a material within the recess 12 that is solid at the normal operating temperature of the sensor, the geophone is preferably disposed in a casing of the type shown in FIG. 1, in order to provide protection for the geophone. The casing would be disposed within a housing generally similar to the housing of the first or second embodiment, except that the means for moving the moveable electrode 14 of the first and second embodiments would not be required. Instead, a heater for heating the locking material would be disposed within the housing. In this embodiment, the electrical connections can be made to the geophone using low friction metallic contacts as in a conventional gimballed geophone. Alternatively, the electrical connections can be made using electrical wires of sufficient length, and a sufficiently small diameter, that they do not restrict the rotation of the casing 1 within the housing.

In principle, the heater for heating the locking material could be disposed on or within the casing 1 of the geophone rather than on the housing 11. It is, however, preferable to place the heater within the housing since this makes it easier to make electrical connections to the heater. Furthermore, the risk of the geophone being damaged by overheating is also reduced.

In the embodiments of the invention described above the geophone is enclosed in a substantially spherical casing, and the recess 12 provided in the housing is also substantially spherical. The invention is not, however, not limited to a spherical casing, and other shapes could be used for the casing. The use of a spherical casing and a spherical recess in the housing are, however, preferable, since this allows the casing to rotate freely around any axis with regard to the housing.

In principle, it would be possible not to provide the casing, and simply dispose a geophone within the recess. (If the casing were omitted, however, it would be necessary to ensure that the geophone had an uneven distribution of mass, for example by adding a bias weight, so that it would adopt an orientation with the axis of its coil vertical when the sensor was unlocked.) Providing the casing is, however, preferable, since this provides greater physical protection for the geophone and thus increases the robustness and reliability of the sensor.

A further advantage of providing a casing is that the average density of a commercially available moving coil geophone is around 4500 kg/m$^3$. This is too heavy to float on most available liquids, except for mercury. By using a lightweight casing, the average overall density of the casing and geophone is reduced. A further reduction in the average overall density is obtained if the casing contains air spaces, as is the case of the casing of FIGS. 1(a) and 1(b). For a given geophone, the larger the casing in which it is enclosed, the more air will be contained within the casing, and the lower will be the overall density of the casing and geophone assembly. This means that if a liquid having a relatively high density, such as CH$_2$Br$_2$ (density 2500 kg/m$^3$) is used, a given geophone will require a smaller casing than if the liquid used has a relatively low density, such as silicon oil (density: 960 kg/m$^3$). For example, a particular geophone might require a casing with an external diameter of 47 mm when used with CH$_2$Br$_2$, but a casing with an external diameter of 65 mm if used with silicon oil.

In the embodiment described with reference to FIGS. 5 to 12 above one of the housing electrodes is fixed. It would be possible for both housing electrodes to be movably mounted in the housing, so that the actuating means would cause both electrodes to move, in opposite directions.

What is claimed is:

1. A seismic sensor comprising:

a housing;

a geophone rotatably mounted within the housing; and a locking means for releasably preventing movement of the geophone relative to the housing, the locking means being movable between a first position in which it exerts a locking force on the geophone so as to prevent movement of the geophone relative to the housing and a second position, and the locking means providing an electrical connection to the geophone when the locking means is in the first position.

2. A seismic sensor as claimed in claim 1 and comprising bias means for biasing the locking means towards one of the first position and the second position.

3. A seismic sensor as claimed in claim 1 wherein the geophone is mounted within a casing, and the locking means exerts a locking force on the casing in its first position.

4. A Seismic sensor as claimed in claim 1 further comprising means for reducing friction between the geophone and the housing, or between the casing and the housing, when the sensor is unlocked.

5. A seismic sensor as claimed in claim 4 wherein the means for reducing fiction comprises a liquid disposed within the housing whereby the geophone floats in the liquid when the sensor is unlocked.

6. A seismic sensor as claimed in claim 5, wherein the liquid has a density greater then the overall density of geophone, or than the overall density of the casing and the geophone.

7. A seismic sensor as claimed in claim 1, further comprising stop means for limiting the movement of the geophone relative to the housing.

8. A seismic sensor as claimed in claim 1, wherein the mass distribution of the geophone, or of a casing and the geophone, is not constant whereby the geophone adopts a preferred orientation relative to a vertical axis when the sensor is unlocked.

* * * * *